(12) United States Patent
Kimura

(10) Patent No.: US 10,766,314 B2
(45) Date of Patent: Sep. 8, 2020

(54) LOAD DERIVATION METHOD

(71) Applicant: BRIDGESTONE CORPORATION, Tokyo (JP)

(72) Inventor: Takeshi Kimura, Kawasaki (JP)

(73) Assignee: BRIDGESTONE CORPORATION, Tokyo (JP)

(*) Notice: Subject to any disclaimer, the term of this patent is extended or adjusted under 35 U.S.C. 154(b) by 213 days.

(21) Appl. No.: 15/735,482

(22) PCT Filed: Jun. 9, 2016

(86) PCT No.: PCT/JP2016/002797
§ 371 (c)(1),
(2) Date: Dec. 11, 2017

(87) PCT Pub. No.: WO2016/203741
PCT Pub. Date: Dec. 22, 2016

(65) Prior Publication Data
US 2018/0162177 A1 Jun. 14, 2018

(30) Foreign Application Priority Data
Jun. 15, 2015 (JP) .................................. 2015-120539

(51) Int. Cl.
*B60C 23/04* (2006.01)
*B60C 11/24* (2006.01)
(Continued)

(52) U.S. Cl.
CPC ............ *B60C 11/246* (2013.01); *B60C 19/00* (2013.01); *B60C 23/04* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 4,089,225 A * 5/1978 Kraska ................ G01M 17/025
73/614
4,089,226 A * 5/1978 Kraska ................ G01M 17/025
73/146
(Continued)

FOREIGN PATENT DOCUMENTS

CN 1852814 A 10/2006
CN 103900832 A 7/2014
(Continued)

OTHER PUBLICATIONS

International Search Report for PCT/JP2016/002797 dated Jul. 5, 2016 [PCT/ISA/210].
(Continued)

*Primary Examiner* — Andre J Allen
(74) *Attorney, Agent, or Firm* — Sughrue Mion, PLLC

(57) ABSTRACT

A load derivation method includes: a distance measurement step of measuring, by a displacement meter attached to a rim, a distance from the displacement meter to an inner surface of a tire; an internal pressure measurement step of measuring an internal pressure of the tire, by a sensor attached in a chamber of the tire; and a load derivation step of deriving, by a derivation section, a load on the tire during running, based on the measured distance and the measured internal pressure.

7 Claims, 2 Drawing Sheets

(51) Int. Cl.
*B60C 23/06* (2006.01)
*B60C 19/00* (2006.01)
*G01L 5/00* (2006.01)

(52) U.S. Cl.
CPC .......... *B60C 23/0486* (2013.01); *B60C 23/06* (2013.01); *B60C 23/066* (2013.01); *G01L 5/00* (2013.01)

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 19/00; B60C 23/0493; B60C 23/04; B60C 23/0498; B60C 23/0496; B60C 23/064; B60C 23/0408; B60C 23/041; B60C 23/0411; B60C 23/0488; B60C 23/20; B60C 11/243; B60C 11/246; B60C 23/06; B60C 23/0486; B60C 23/061; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28

USPC ................................ 73/146–146.8
See application file for complete search history.

(56) References Cited

U.S. PATENT DOCUMENTS

| | | | |
|---|---|---|---|
| 5,913,240 A * | 6/1999 | Drahne | B60T 8/1725 73/146 |
| 6,269,690 B1 * | 8/2001 | Shimizu | B60C 11/24 73/146 |
| 7,483,794 B2 * | 1/2009 | Bocquillon | B60C 11/24 701/36 |
| 7,640,216 B2 | 12/2009 | Laubie et al. | |
| 8,849,500 B2 * | 9/2014 | Gokyu | B60C 11/246 152/343.1 |
| 2005/0080777 A1 | 4/2005 | Champeau | |
| 2006/0201240 A1 | 9/2006 | Morinaga | |
| 2007/0240502 A1 | 10/2007 | Morinaga et al. | |
| 2011/0193696 A1 * | 8/2011 | Wagner | B60C 23/064 340/438 |
| 2015/0096362 A1 * | 4/2015 | Hammerschmidt | G01M 17/025 73/146 |
| 2015/0217607 A1 * | 8/2015 | Singh | B60C 23/0488 152/510 |
| 2017/0334254 A1 * | 11/2017 | Limbrunner | B60C 11/246 |
| 2018/0162177 A1 | 6/2018 | Kimura | |

FOREIGN PATENT DOCUMENTS

| | | | | |
|---|---|---|---|---|
| EP | 2703194 A1 * | 3/2014 | | G07C 5/08 |
| EP | 3309527 B1 | 4/2019 | | |
| JP | 2004-138446 A | 5/2004 | | |
| JP | 2005-219577 A | 8/2005 | | |
| JP | 2007010405 A | 1/2007 | | |
| JP | 4558327 B2 | 10/2010 | | |
| JP | 4680532 B2 | 5/2011 | | |
| JP | WO2016/203741 A1 | 4/2018 | | |

OTHER PUBLICATIONS

Communication dated May 22, 2018 from the European Patent Office in counterpart European application No. 16811216.7.
Zhang Zhi, "Techniques for Repairing Automotive Body", Yanbian People's Publisher, Mar. 31, 2004, pp. 284-290 (17 pages total).
Communication dated Jun. 4, 2019, from the China National Intellectual Property Administration in counterpart Application No. 201680034440.6.

* cited by examiner

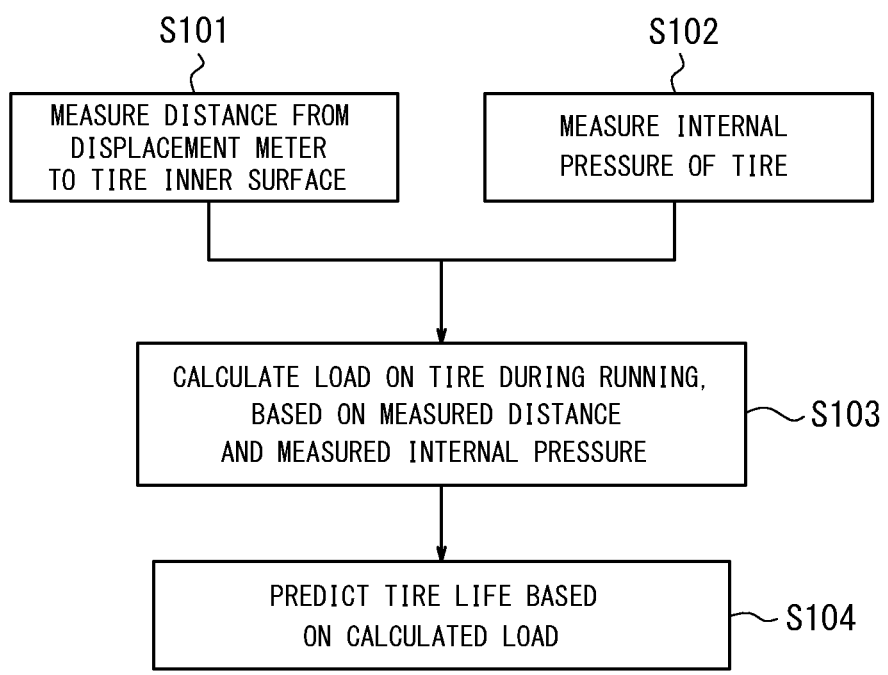
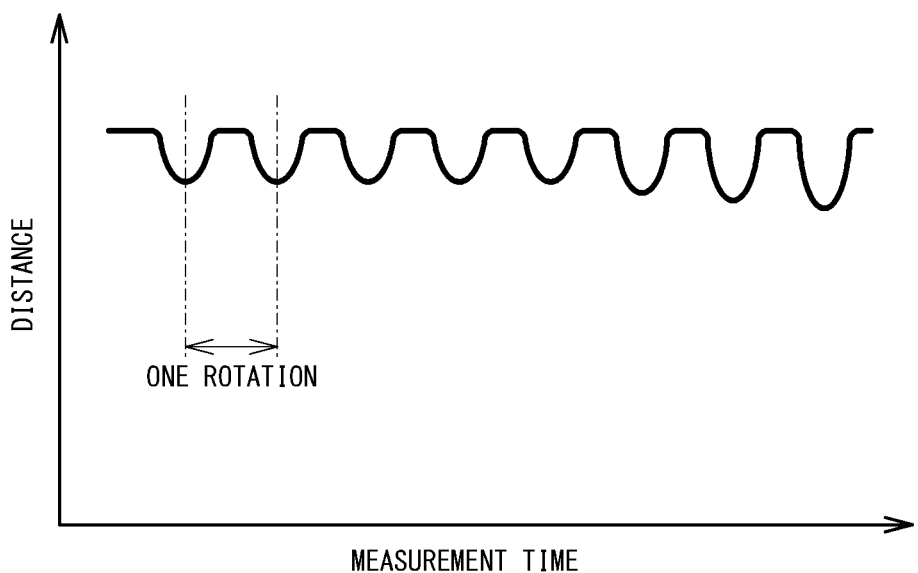

LOAD DERIVATION METHOD

CROSS REFERENCE TO RELATED APPLICATIONS

This application is a National Stage of International Application No. PCT/JP2016/002797 filed Jun. 9, 2016, claiming priority based on Japanese Patent Application No. 2015-120539 filed Jun. 15, 2015, the contents of all of which are incorporated herein by reference in their entirety.

TECHNICAL FIELD

This disclosure relates to a load derivation method, and particularly relates to a method of deriving a load on a pneumatic tire for construction/mine vehicles.

BACKGROUND

Tires for construction vehicles are conventionally subjected to various prediction simulations (for example, see JP 4558327 B2 (PTL 1)). In particular, the wear amount, durability, etc. of a pneumatic tire for construction vehicles are evaluated to predict the tire life. For example, the tire life is predicted by evaluating the wear amount or durability of the tire, based on information of the internal pressure measured using a tire internal pressure sensor and information of the running speed and load of the vehicle obtained from a vehicle sensor.

CITATION LIST

Patent Literature

PTL 1: JP 4558327 B2

SUMMARY

Technical Problem

With the above-mentioned technique, however, it is difficult to obtain information of the actual load on each construction vehicle tire, although information of the weight loaded on the vehicle can be obtained. Besides, the vehicle sensor attached to the construction vehicle tends to decrease in accuracy due to change over time and the like. Thus, the above-mentioned technique has a problem in that the wear amount or durability of the tire cannot always be evaluated accurately and so the tire life cannot be predicted accurately. The same problem can be seen in pneumatic tires for mine vehicles.

It could therefore be helpful to provide a load derivation method with which an actual load on a tire can be recognized accurately.

Solution to Problem

We thus provide the following:
A load derivation method according to this disclosure includes: a distance measurement step of measuring, by a displacement meter attached to a rim, a distance from the displacement meter to an inner surface of a tire; an internal pressure measurement step of measuring an internal pressure of the tire, by a sensor attached in a chamber of the tire; and a load derivation step of deriving, by a derivation section, a load on the tire during running, based on the measured distance and the measured internal pressure.

The term "chamber" refers to the space between the tire inner surface and the rim wheel.

Advantageous Effect

It is thus possible to provide a load derivation method with which an actual load on a tire can be recognized accurately

BRIEF DESCRIPTION OF THE DRAWINGS

In the accompanying drawings:
FIG. 2 is a flowchart illustrating a load derivation method according to one of the disclosed embodiments;
and
FIG. 3 is a schematic diagram illustrating the relationship between the measurement time and the measured distance by a displacement meter.

DETAILED DESCRIPTION

Figure 1:
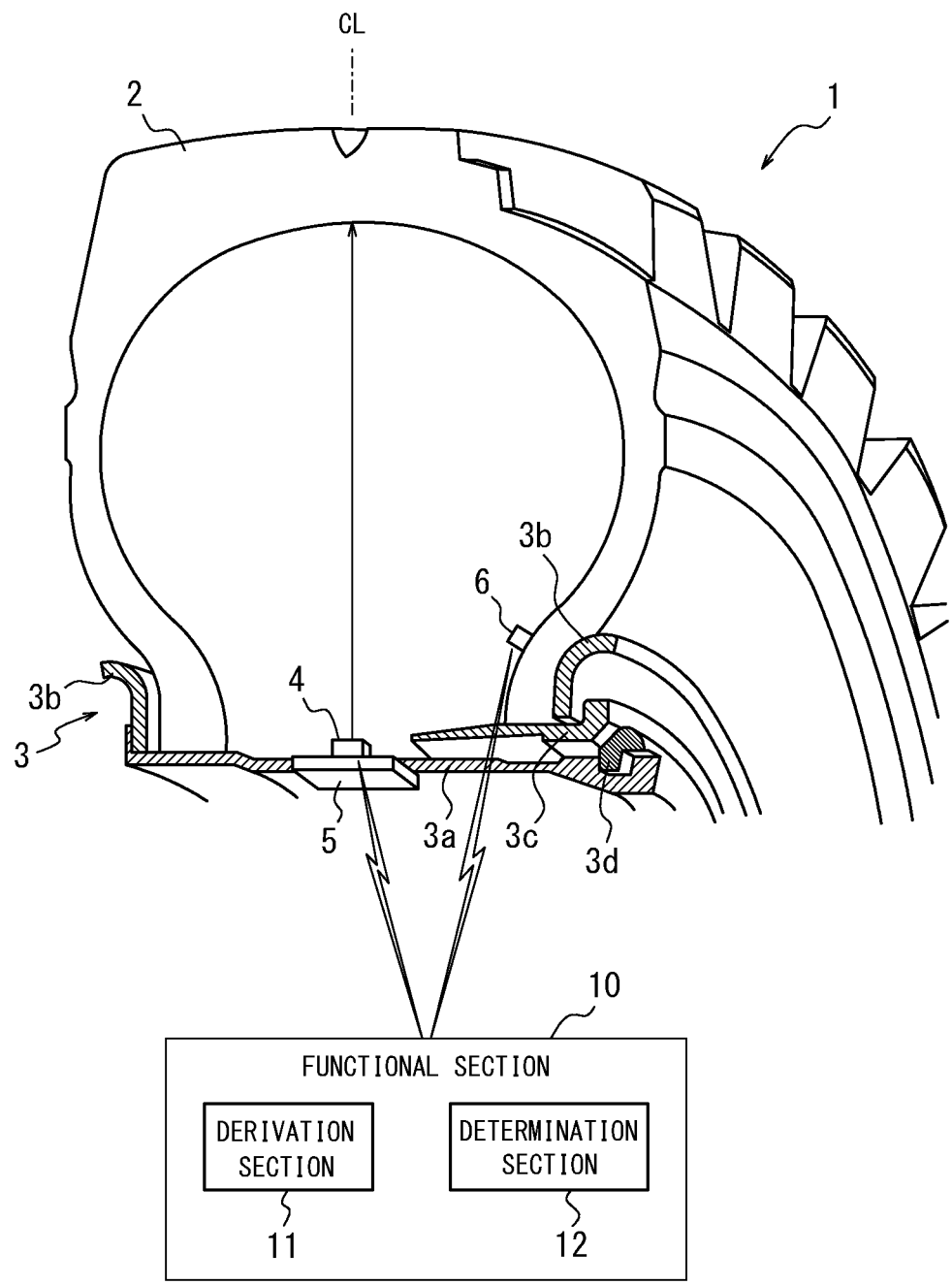
FIG. 1 is a perspective sectional view of a tire/rim assembly and a diagram illustrating an external functional section for describing a load derivation method according to one of the disclosed embodiments.

Disclosed embodiments are described in detail below, with reference to the drawings.

FIG. 1 is a perspective sectional view of a tire/rim assembly and a diagram illustrating an external functional section for describing a load derivation method according to one of the disclosed embodiments. This embodiment is suitable for deriving a load on a pneumatic tire for construction/mine vehicles (hereafter also simply referred to as "tire"). As illustrated in FIG. 1, a tire/rim assembly 1 is formed by attaching a tire 2 to a rim 3. In the illustrated example, the rim 3 is a segment rim. The rim 3 includes a rim base portion 3a extending in the tire width direction in the state where the tire 2 is attached to the rim 3, and a rim flange portion 3b in contact with a bead portion of the tire 2. On one side in the extending direction of the rim base portion 3a which is the tire width direction, the rim base portion 3a and the rim flange portion 3b directly fit to each other. On the other side in the extending direction of the rim base portion 3a which is the tire width direction, the rim flange portion 3b is fittable to a bead sheet band portion 3c, and the bead sheet band portion 3c and the rim base portion 3a are removably attachable to each other by a lock ring 3d.

The rim base portion 3a of the rim 3 has one hole at a tire width direction position on an extension of a tire equatorial plane CL, in the example illustrated in FIG. 1. A displacement meter 4 is attached in this hole through an attachment plate 5, thus being attached and fixed to the rim 3. The displacement meter 4 is capable of measuring the distance from the position of the displacement meter 4 to the tire inner surface (in the case where an inner liner is attached to the tire inner surface, the distance from the position of the displacement meter 4 to the inner liner). The displacement meter 4 is preferably an optical displacement meter, and particularly preferably a laser displacement meter. Such a displacement meter can measure the above-mentioned distance easily. The displacement meter 4 may be any meter capable of measuring the above-mentioned distance. Examples include not only an optical displacement meter, but also other well-known displacement meters such as a contact-type displacement meter. The arrow in FIG. 1 indicates the position of the tire inner surface subjected to the distance measurement. In the example illustrated in FIG. 1, the displacement meter 4 is attached at a position that deviates from the bead sheet band portion 3c in the tire width direction, in one part on the circumference.

In the example illustrated in FIG. 1, the displacement meter 4 is attached in the hole of the rim base portion 3a. Alternatively, the displacement meter 4 may be placed on and fixed to the rim base portion 3a. In this case, the rim base portion 3a need not have a hole for attaching the displacement meter 4. A point on the tire inner surface subjected to the measurement is preferably at a position (on a line extending in the tire radial inward direction from the below-mentioned middle position) corresponding to the tire width direction range from the tire equatorial plane CL to the middle position of the half-width of the ground contact width in the tire width direction in the state of the tire/rim assembly 1 (the state where the tire 2 is filled to a prescribed internal pressure and placed under no load) (in the example illustrated in FIG. 1, a point on the tire inner surface directly below the tire equatorial plane CL). Thus, it is preferable to measure the distance from the displacement meter 4 to the tire inner surface at a tire width direction position corresponding to the tire width direction range in which a belt layer is located.

The term "ground contact width" refers to the width measured in the tire width direction between the tire width direction outer edges of the contact patch that comes into contact with the road surface when the tire attached to an applicable rim and filled to a prescribed internal pressure is placed under a maximum load. The term "applicable rim" refers to an approved rim ("measuring rim" in ETRTO Standards Manual, "design rim" in TRA Year Book) in applicable size described in an effective industrial standard in areas where tires are produced or used, such as JATMA (Japan Automobile Tyre Manufacturers Association) Year Book in Japan, ETRTO (European Tyre and Rim Technical Organisation) Standards Manual in Europe, or TRA (Tire and Rim Association, Inc.) Year Book in the United States. The term "prescribed internal pressure" refers to the air pressure corresponding to the maximum load capability in applicable size and ply rating described in JATMA Year Book or the like. The term "maximum load capability" refers to the maximum mass permitted to be loaded onto the tire in the standard. The term "maximum load" refers to the load corresponding to the maximum load capability.

As illustrated in FIG. 1, a sensor 6 is attached in the chamber of the tire/rim assembly 1 (attached to the bead portion inner surface of the tire in the illustrated example). In this example, the sensor 6 can continuously measure the internal pressure of the tire. The sensor 6 preferably measures the internal pressure while measuring the temperature in the chamber.

FIG. 2 is a flowchart illustrating a load derivation method according to one of the disclosed embodiments. In the load derivation method according to this embodiment, for example using the tire/rim assembly 1 having the structure illustrated in FIG. 1, the distance from the displacement meter 4 to the tire inner surface is measured by the displacement meter 4 attached to the rim 3 (distance measurement step: step S101). Although the distance from the displacement meter 4 to at least one point on the tire inner surface may be measured here, it is preferable to measure the distance from the displacement meter 4 to each of two or more points in the tire circumferential direction on the tire inner surface, or the distance from the displacement meter 4 to each of a plurality of points continuous on a line. Thus, the advantageous effects according to this disclosure can be achieved even in such a case where a tear occurs on the tire. Step S101 is preferably performed continuously in real time. Alternatively, step S101 may be performed intermittently. In this case, the point(s) subjected to the measurement is unchanged.

Moreover, in this embodiment, for example using the tire/rim assembly 1 having the structure illustrated in FIG. 1, the internal pressure of the tire 2 is measured by the sensor 6 attached in the chamber of the tire 2 (internal pressure measurement step: step S102). Step S102 is preferably performed continuously in real time, but may be performed intermittently. In step S102, it is preferable to measure the internal pressure at the time at which the distance is measured in step S101. Alternatively, information of the internal pressure corresponding to the distance measured in step S101 may be obtained by, for example, complementing the internal pressure data measured in step S102.

Next, in this embodiment, for example using the tire/rim assembly 1 having the structure illustrated in FIG. 1, the load on the tire during running is derived based on the distance measured by the displacement meter 4 and the internal pressure measured by the sensor 6 (load derivation step: step S103).

FIG. 3 is a schematic diagram illustrating the relationship between the measurement time and the measured distance by the displacement meter. As illustrated in FIG. 3, the distance from the displacement meter to a specific point on the tire inner surface shortens when the point is in the contact patch. Hence, the distance can be associated with the load on the tire during running (i.e. it is possible to link a shorter distance to a greater load on the tire). Its quantitative degree, however, varies depending on the state of the internal pressure of the tire. Accordingly, the load can be derived accurately by using the measured distance and the measured internal pressure as in this embodiment. In this embodiment, it is preferable to hold, as a look-up table or the like, information indicating the relationship between the distance, the internal pressure, and the load prepared beforehand, and derive the load based on the measured distance, the measured internal pressure, and the information. Thus, the load can be derived easily. Preferably, the displacement meter 4 and the sensor 6 have a communication portion that transmits the information of the measured distance and internal pressure to the vehicle or the outside, and a derivation section 11 in an external functional section 10 having information indicating the relationship between the measured distance and internal pressure and the load on the tire during running derives the load. Thus, it is preferable to cause the functional section in the tire/rim assembly 1 to perform only simple processes. Alternatively, the derivation section 11 may be included in the tire/rim assembly 1.

After the load is derived by the load derivation method according to this embodiment, a determination section 12 can predict the tire life based on the derived load (step S104). Since the durability, wear amount, etc. of the tire greatly depend on the load on the tire, the durability or wear amount of the tire can be accurately predicted based on the derived load. The determination section 12 is preferably included in the functional section 10 that includes the derivation section 11.

With the load derivation method according to this embodiment, for example, an actual load on a tire for construction/mine vehicles during running can be derived accurately. Hence, for example, the durability or wear amount of the tire can be accurately predicted based on the derived load, to accurately predict the tire life. Since the tire life is predicted based on the actual load, accurate prediction is achieved as compared with the case of predicting the tire life using a load mounted on the vehicle. The user can perform management such as changing the tire use condition to a gentler condition or replacing tires between vehicles, depending on the prediction result. In the case where the displacement meter 4 is attached to the tire 2, the displacement meter 4 itself is displaced due to deformation of the tire 2, so that the distance cannot be measured accurately. Besides, To attach the displacement meter 4 to the tire 2, processes such as buffing the inner liner, then performing cleaning, and then adhering the displacement meter 4 with unvulcanized rubber are required. In this embodiment, on the other hand, since the displacement meter 4 is attached to the rim 3, not only the distance can be measured accurately but also the above-mentioned processes can be omitted. Furthermore, since the displacement meter 4 is attached to the rim 3, an external power source can be used. This makes it possible to keep using the method according to this embodiment, regardless of battery life and the like.

In this disclosure, the load is preferably derived per tire rotation. Thus, the load can be derived per tire rotation, i.e. each time the point subjected to the measurement enters the contact patch as described with reference to FIG. 3, so that the data of the load derived per tire rotation can be used to accurately predict the tire life.

Preferably, the load derivation method according to this disclosure further includes a step of calculating the running speed and/or the running acceleration based on the temporal change of the measured distance and the measured internal pressure. A period in which the measured distance shortens occurs per tire rotation, as illustrated in FIG. 3. Accordingly, by detecting the temporal change of the measured distance, the running speed and/or the running acceleration can be calculated easily. The relationship between the distance and the running speed and/or the running acceleration varies with the internal pressure, and so the running speed and/or the running acceleration is calculated based on the measured internal pressure. The use of the running speed and/or the running acceleration in addition to the derived load enables more accurate prediction of the tire life. In this disclosure, the running speed and/or the running acceleration is preferably calculated per tire rotation, for the same reason as stated above.

In the tire life prediction step (step S104), the durability of the tire can be evaluated based on the derived load. Moreover, in the tire life prediction step (step S104), the wear amount of the tire can be evaluated based on the derived load. Having evaluated the durability or wear amount of the tire based on the derived load, the tire life can be predicted using the evaluation result as an index. The advantageous effects according to this disclosure can thus be utilized effectively. Both the durability of the tire and the wear amount of the tire may be evaluated and used as indices of the tire life.

The tire life prediction step (step S104) may be performed by simulating the deformation of the tire members based on the derived load. Thus, the durability of the tire can be evaluated more accurately based on the load and the deformation of the tire members caused by the load, as a result of which the tire life can be predicted accurately. The simulation may be performed using FEM as an example. When evaluating the wear amount of the tire, on the other hand, it is preferable to derive/calculate the load, the running speed, and the running acceleration, as mentioned above. The wear amount of the tire can be evaluated more accurately using these derived/calculated information, as a result of which the tire life can be predicted accurately.

While one of the disclosed embodiments has been described above, the load derivation method according to this disclosure is not limited to the above embodiment. For example, although the sensor 6 is separate from the displacement meter 4 in the above embodiment, the displacement meter 4 may have a function of measuring the internal pressure of the tire. Other various modifications are possible.

REFERENCE SIGNS LIST 1 tire/rim assembly
2 tire
3 rim
3a rim base portion
3b rim flange portion
3c bead sheet band portion
3d lock ring
4 displacement meter
5 attachment plate
6 sensor
10 functional section
11 derivation section
12 determination section

The invention claimed is:

1. A tire life prediction method comprising:
measuring, by a displacement meter attached to a rim, a distance from the displacement meter to an inner surface of a tire;
measuring an internal pressure of the tire, by a sensor attached in a chamber of the tire;
deriving, by a derivation section, a load on the tire during running, based on the measured distance and the measured internal pressure,
predicting a tire life by a determination section based on the load derived based on the measured distance and the measured internal pressure,
wherein the displacement meter is attached on or in a hole of a rim base portion.

2. The tire life prediction method according to claim 1, wherein the load is derived per tire.

3. The tire life prediction method according to claim 1, wherein the load is derived based on the measured distance, the measured internal pressure, and information indicating a relationship between the distance, the internal pressure, and the load prepared.

4. The tire life prediction method according to claim 1, wherein the displacement meter is a laser displacement meter.

5. The tire life prediction method according to claim 1, wherein the measuring is performed continuously in real time.

6. The tire life prediction method according to claim 1, wherein the predicting comprises evaluating wear amount.

7. A tire life prediction method comprising:
measuring, by a displacement meter attached to a rim, a distance from the displacement meter to an inner surface of a tire;
measuring an internal pressure of the tire, by a sensor attached in a chamber of the tire; and
deriving, by a derivation section, a load on the tire during running, based on the measured distance and the measured internal pressure,
predicting a tire life by a determination section based on the load derived based on the measured distance and the measured internal pressure, wherein the displacement meter is attached on or in a hole of a rim base portion, and wherein the displacement meter is attached at a position that deviates from a bead sheet band portion in the tire width direction.

* * * * *